(12) United States Patent
Jung et al.

(10) Patent No.: US 11,952,052 B2
(45) Date of Patent: Apr. 9, 2024

(54) SERVICE MODULE AND MOBILE ROBOT HAVING THE SAME

(71) Applicant: LG ELECTRONICS INC., Seoul (KR)

(72) Inventors: Chungin Jung, Seoul (KR); Sunho Yang, Seoul (KR); Eulpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 842 days.

(21) Appl. No.: 16/982,931

(22) PCT Filed: Jan. 2, 2019

(86) PCT No.: PCT/KR2019/000055
§ 371 (c)(1),
(2) Date: Sep. 21, 2020

(87) PCT Pub. No.: WO2020/141630
PCT Pub. Date: Jul. 9, 2020

(65) Prior Publication Data
US 2021/0009208 A1    Jan. 14, 2021

(51) Int. Cl.
*B62D 33/02* (2006.01)
(52) U.S. Cl.
CPC .................................... *B62D 33/02* (2013.01)
(58) Field of Classification Search
CPC .. G05D 1/0212; G05D 1/0248; G05D 1/0274; G06F 30/13; G01S 17/88; G01S 17/89; G06T 7/579

USPC ................ 180/204; 318/568.11, 568.12
See application file for complete search history.

(56) References Cited

U.S. PATENT DOCUMENTS

| 2007/0199108 A1* | 8/2007 | Angle ................... G16H 70/40 901/17 |
| 2015/0012163 A1 | 1/2015 | Crawley |
| 2017/0128099 A1 | 5/2017 | Alduaiji et al. |
| 2017/0312916 A1 | 11/2017 | Williams et al. |

FOREIGN PATENT DOCUMENTS

| KR | 10-2009-0007818 A | 1/2009 |
| KR | 10-2017-0141163 A | 12/2017 |
| KR | 10-2018-0080493 A | 7/2018 |
| KR | 10-2018-0109107 A | 10/2018 |
| KR | 10-2018-0121036 A | 11/2018 |

OTHER PUBLICATIONS

International Search Report (PCT/ISA/210) issued in PCT/KR2019/000055 dated Sep. 26, 2019.

* cited by examiner

*Primary Examiner* — Jacob D Knutson
*Assistant Examiner* — Felicia L. Brittman
(74) *Attorney, Agent, or Firm* — Birch, Stewart, Kolasch & Birch, LLP

(57) ABSTRACT

According to an embodiment of the present disclosure, a service module may include a main body having an accommodation space in which an article is accommodated, a slam module installed on an upper portion of the main body, and a wire guide groove defined in the main body to guide an electric wire connected to the slam module. The slam module may has an upper end having a height lower than a height of a top surface of the main body.

14 Claims, 17 Drawing Sheets

【Figure 1】
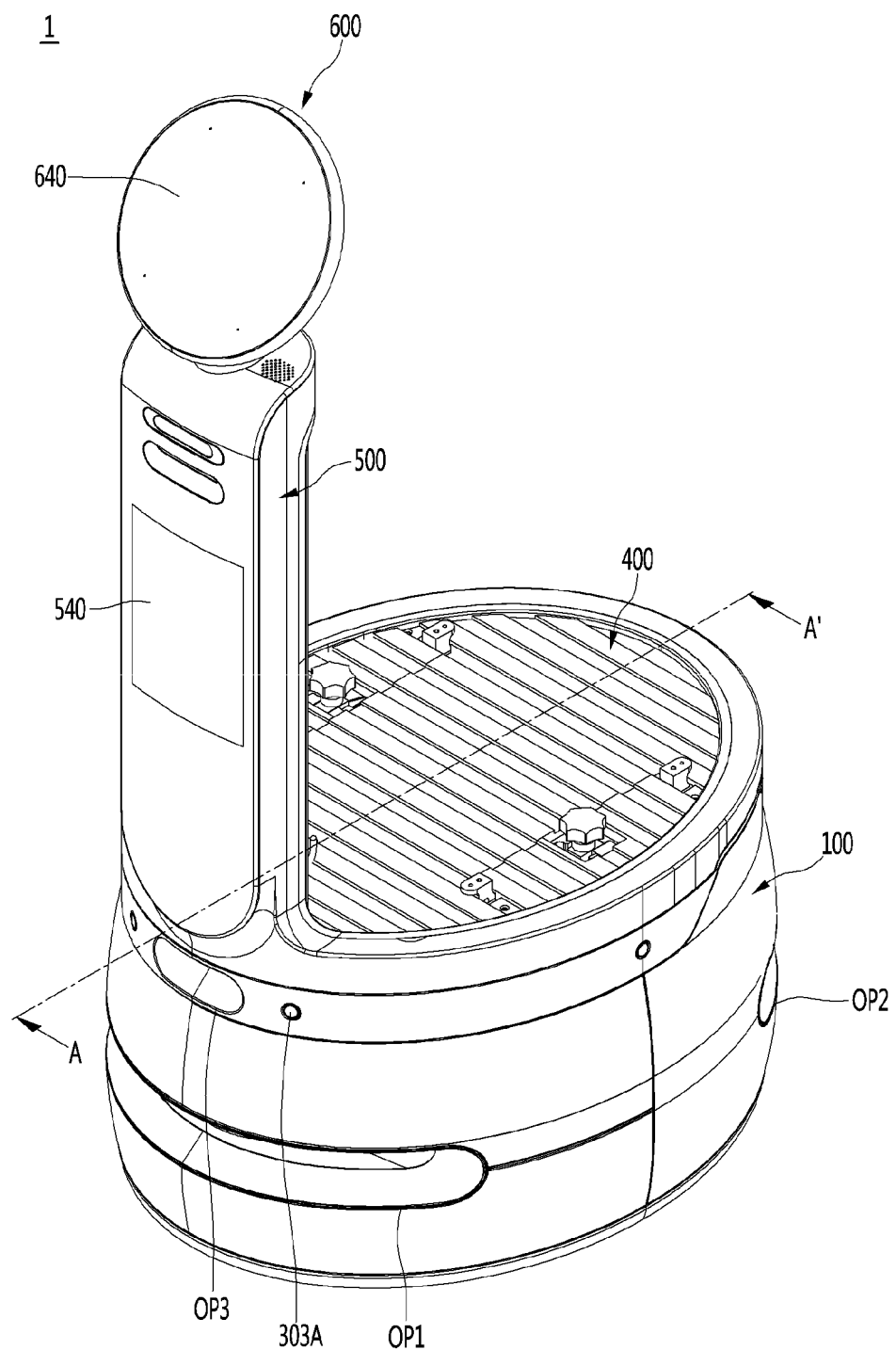

【Figure 2】
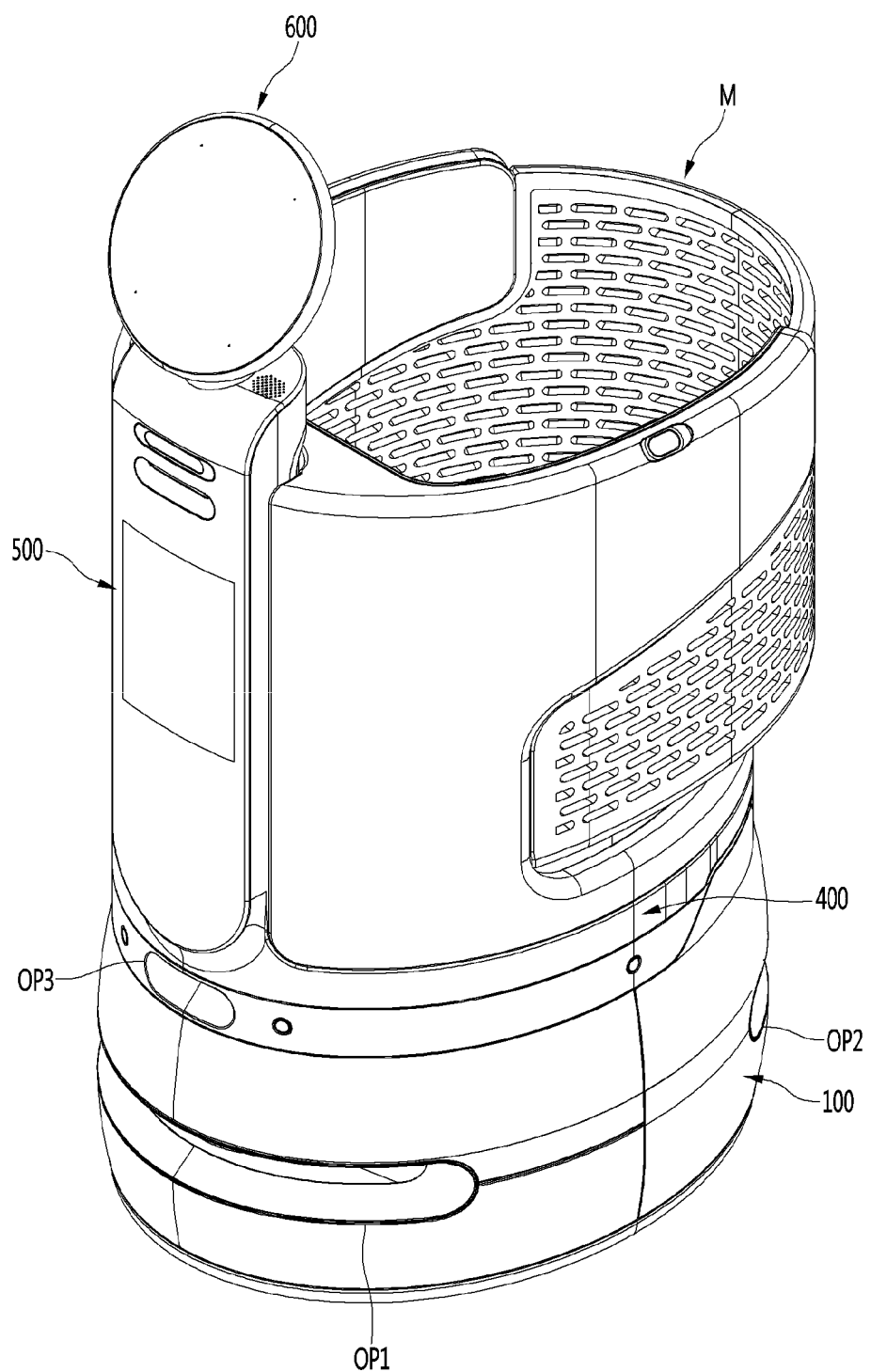

【Figure 3】
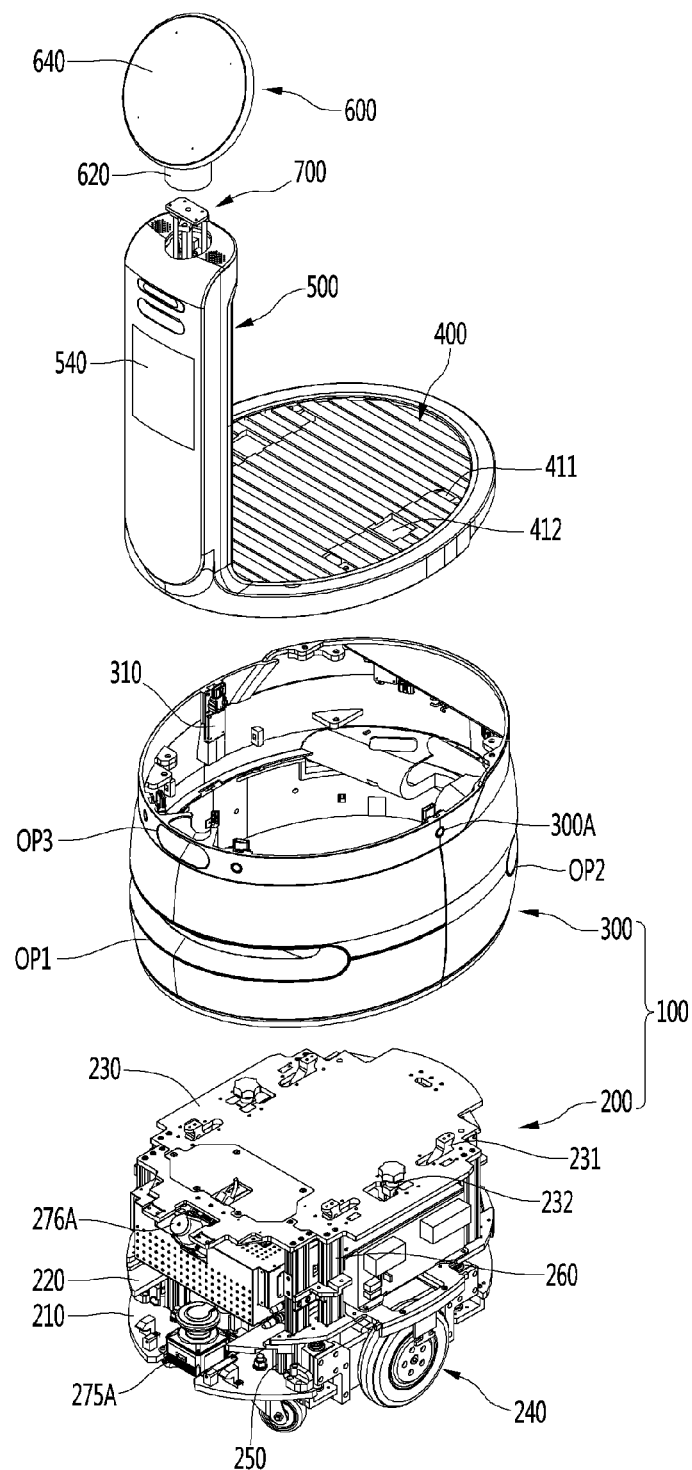

[Figure 4]
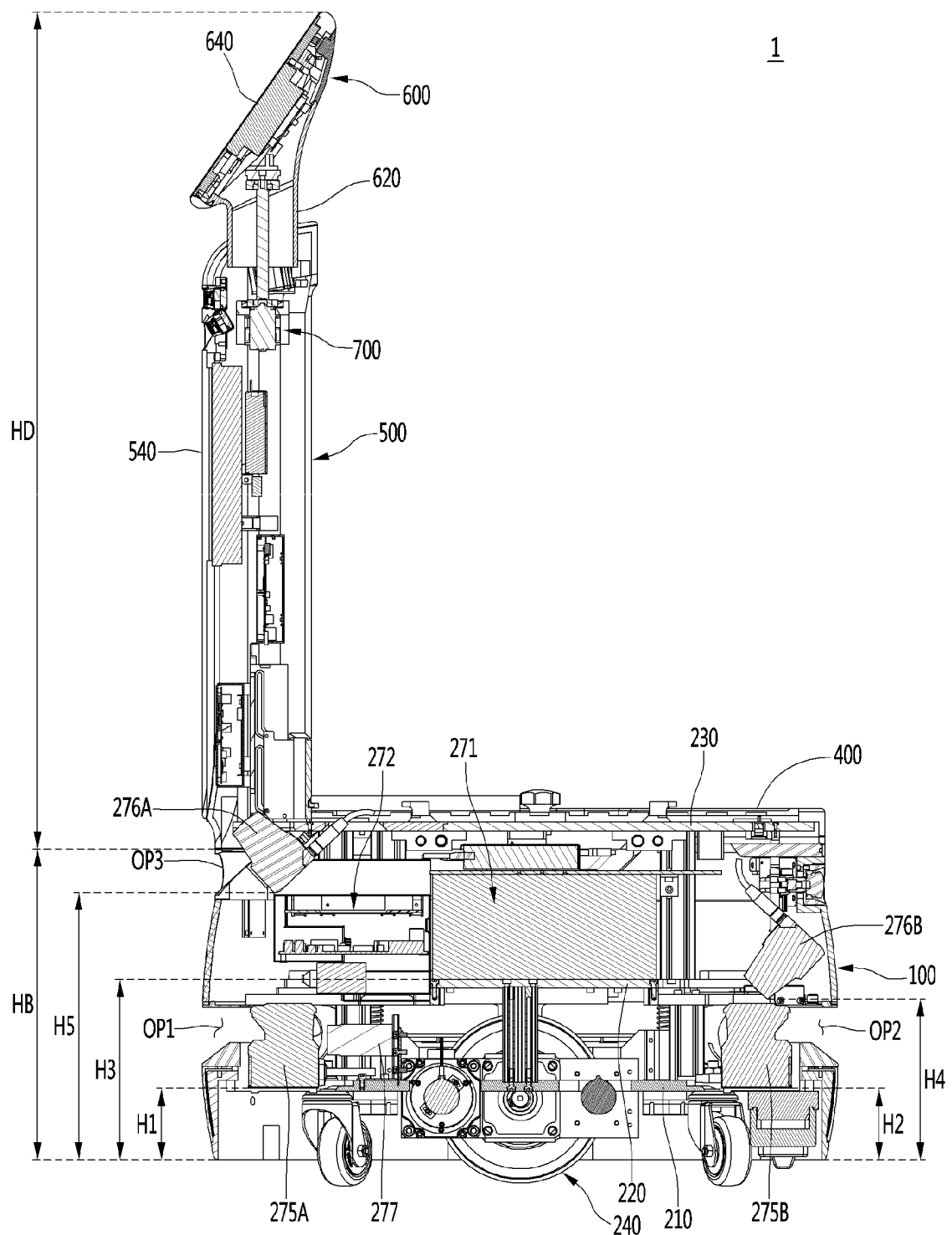

[Figure 5]
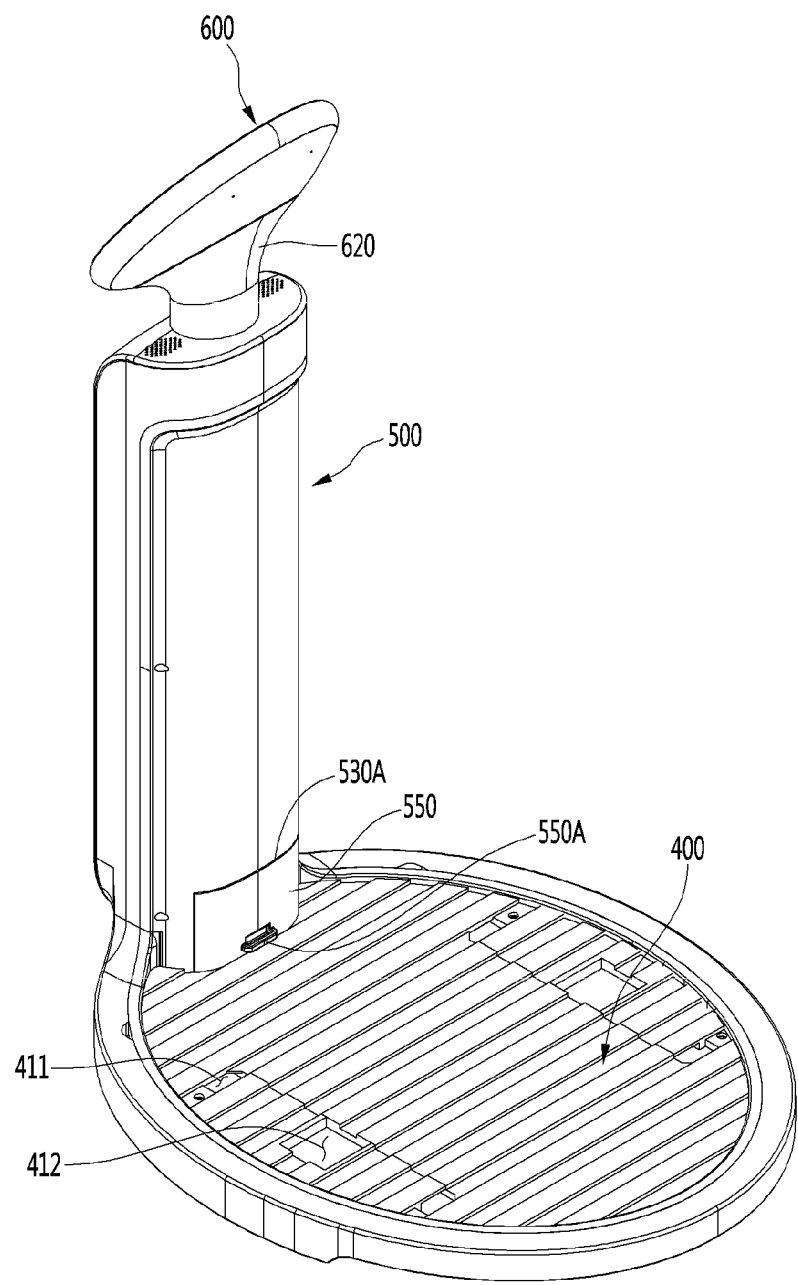

[Figure 6]
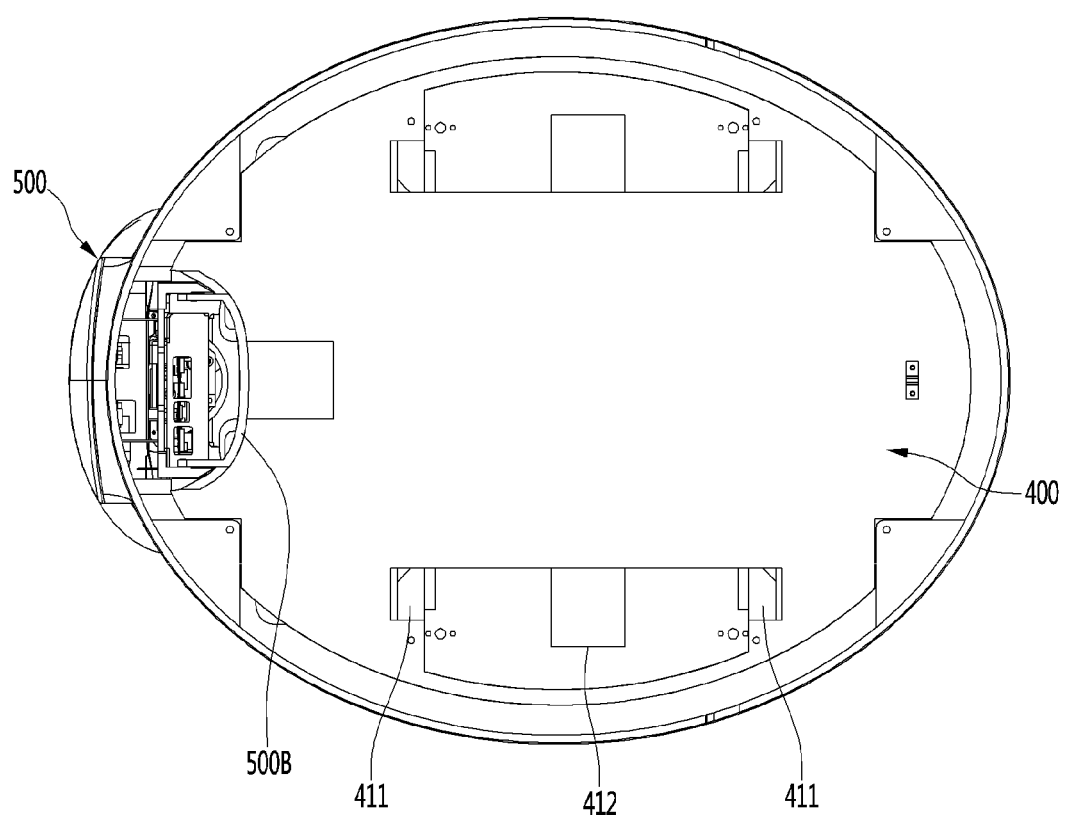

【Figure 7】
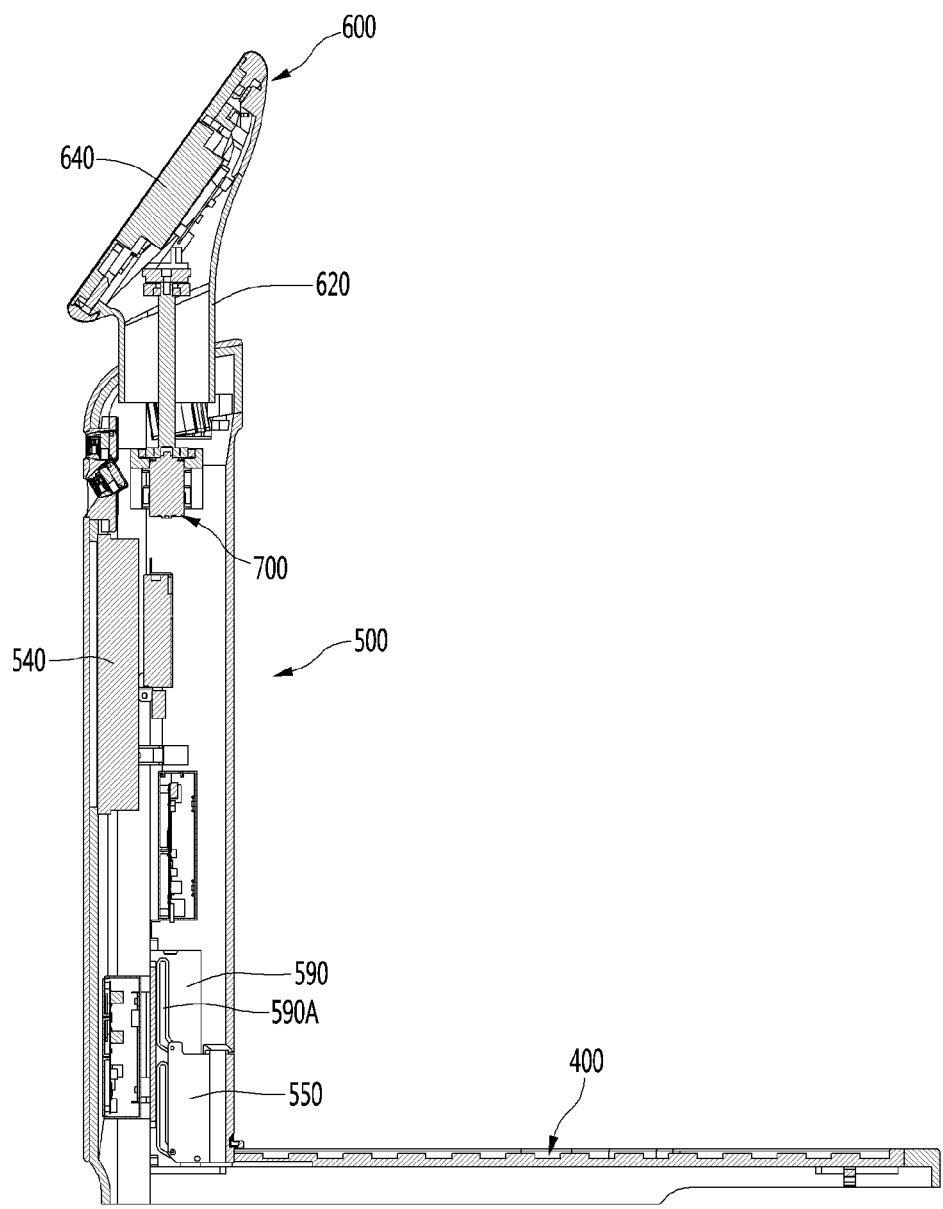

【Figure 8】
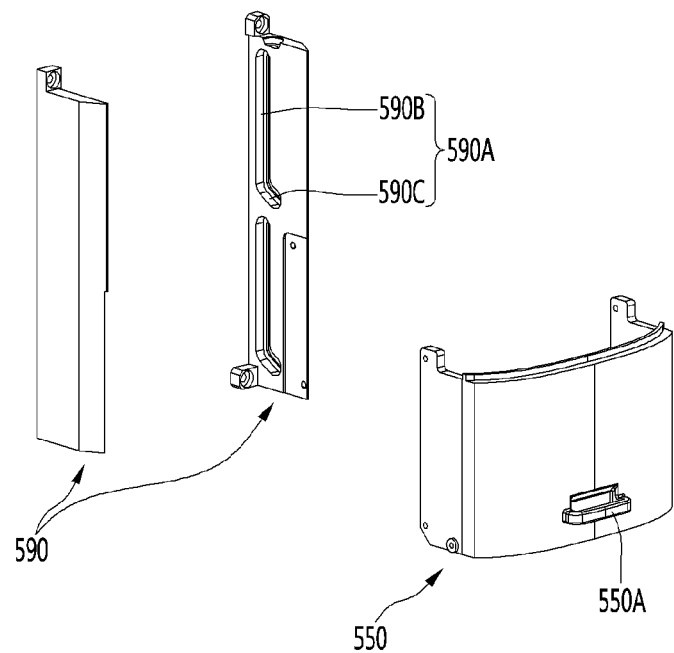

[Figure 9]
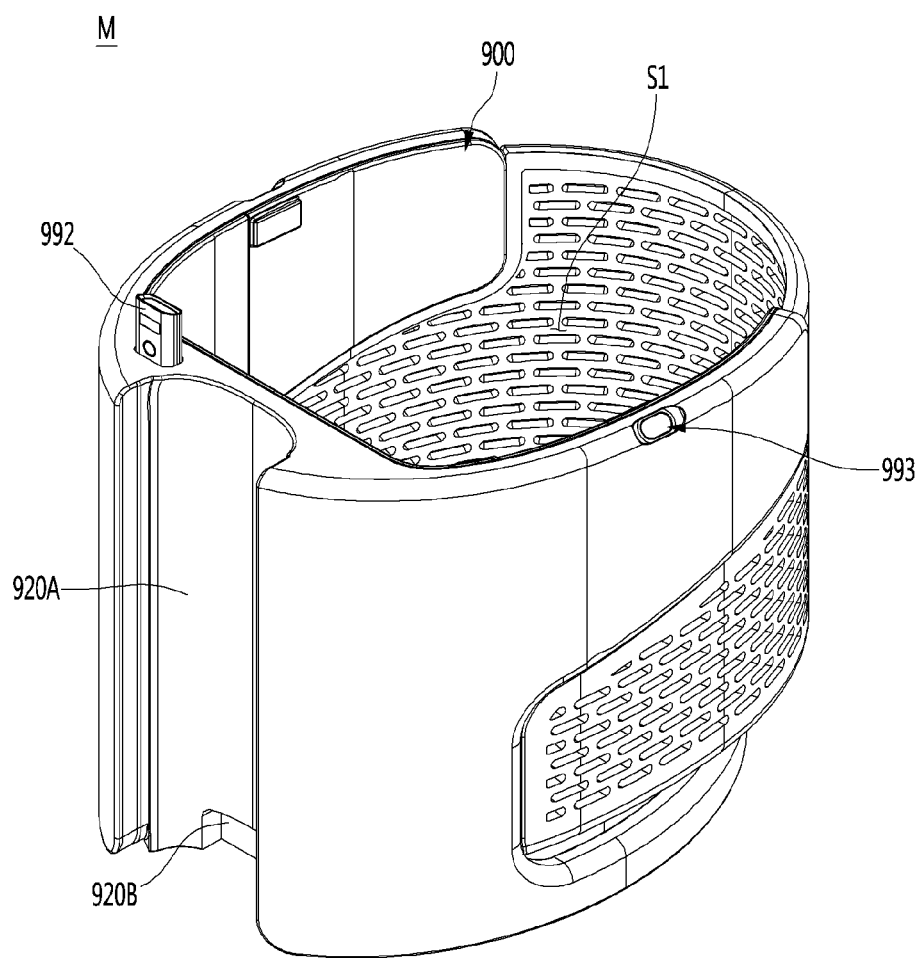

[Figure 10]
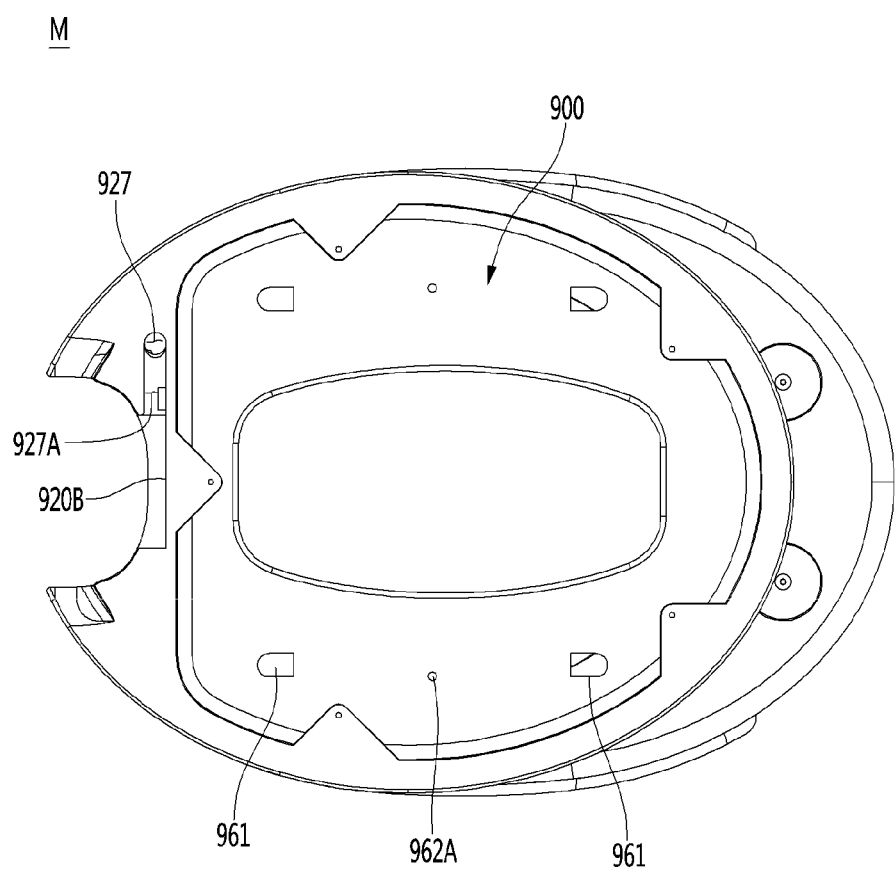

[Figure 11]
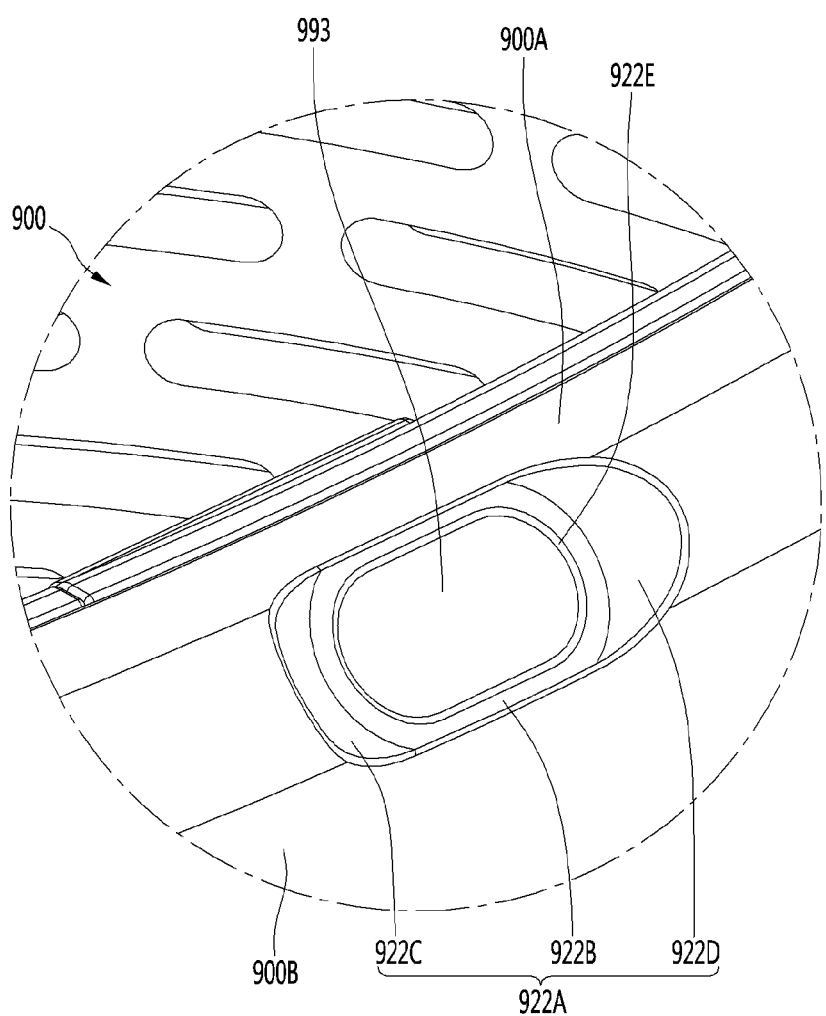

[Figure 12]
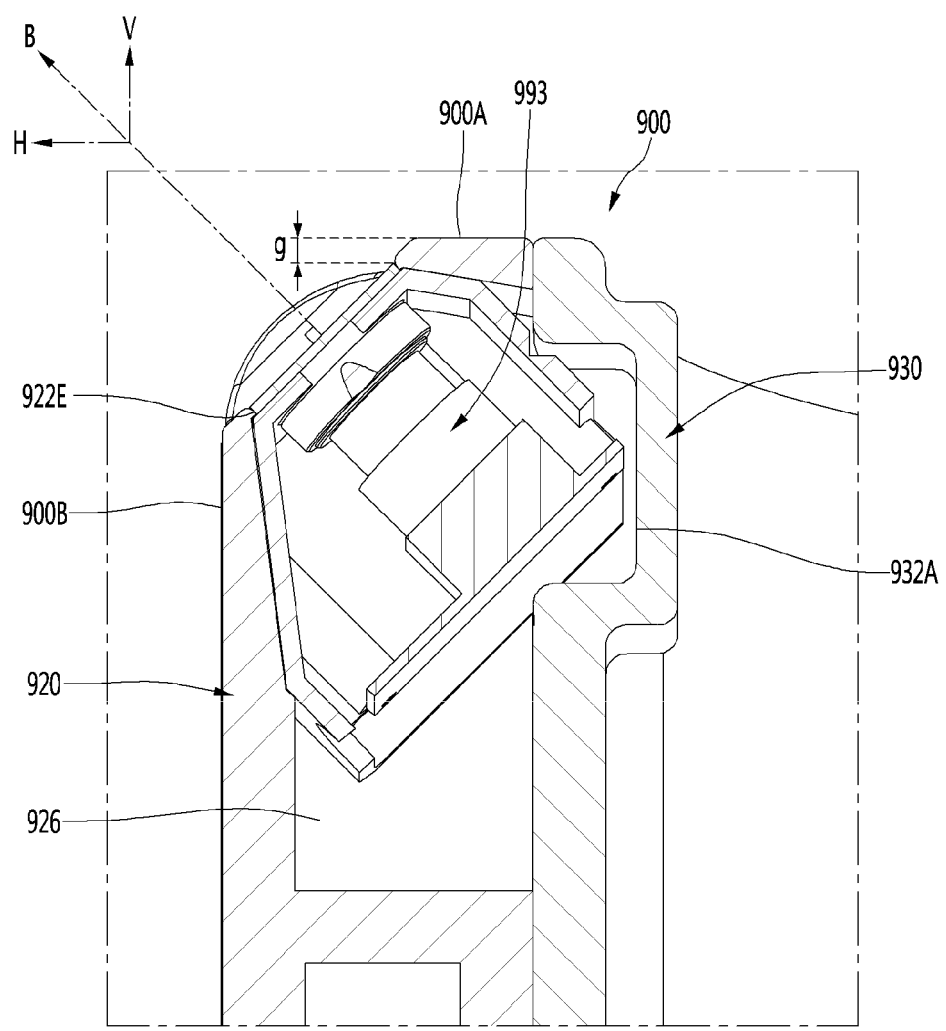

[Figure 13]
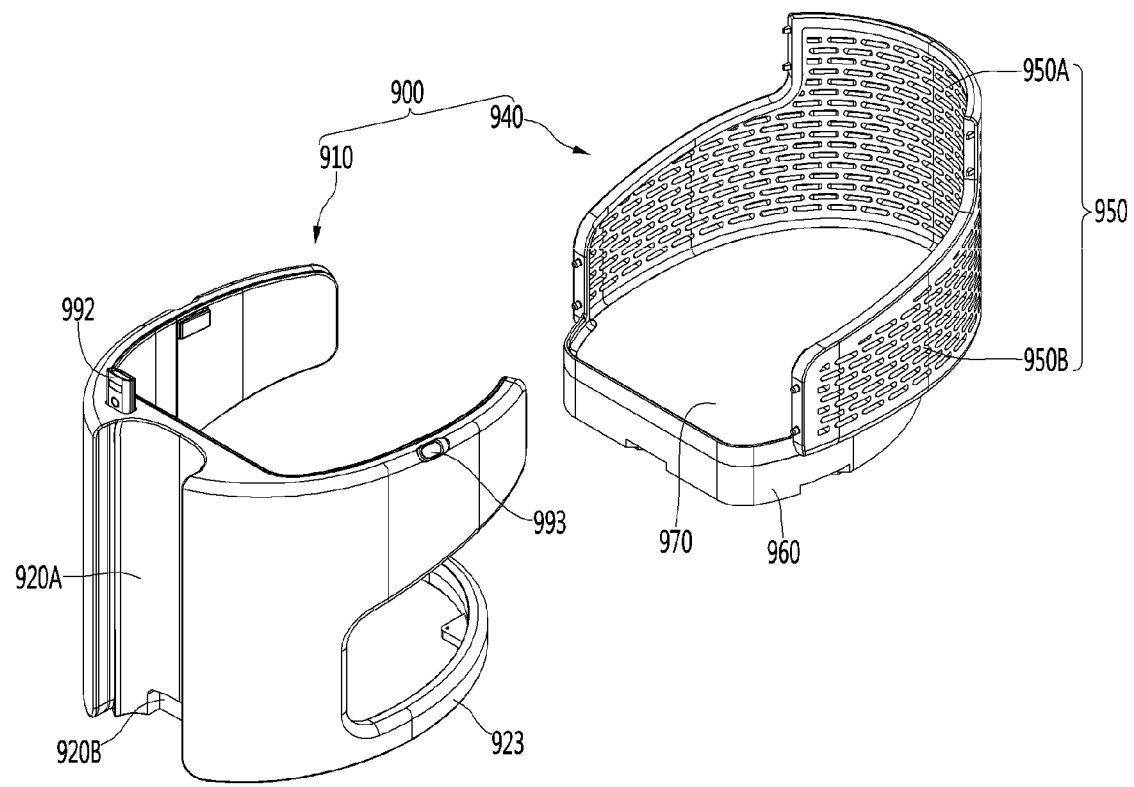

【Figure 14】
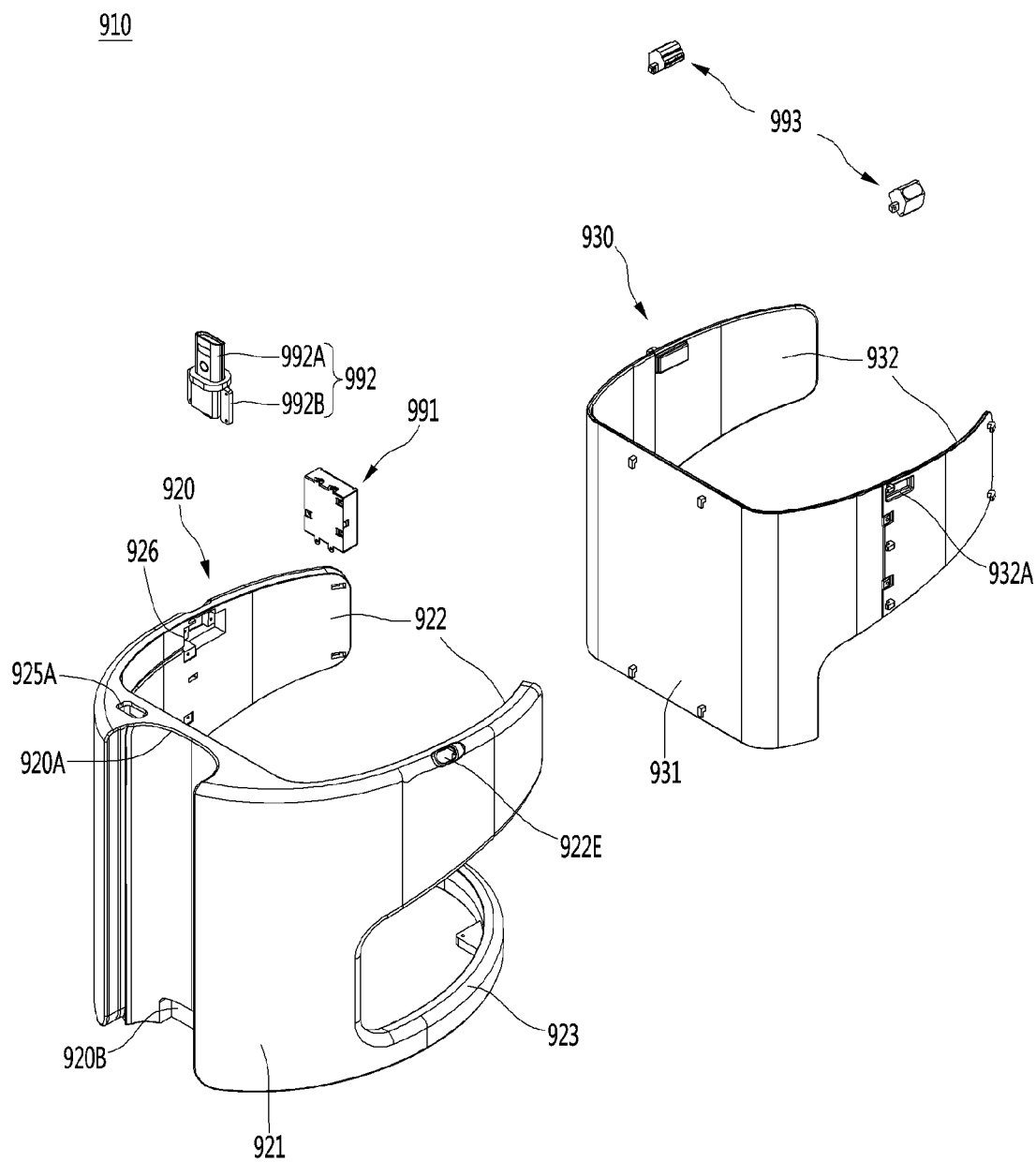

[Figure 15]
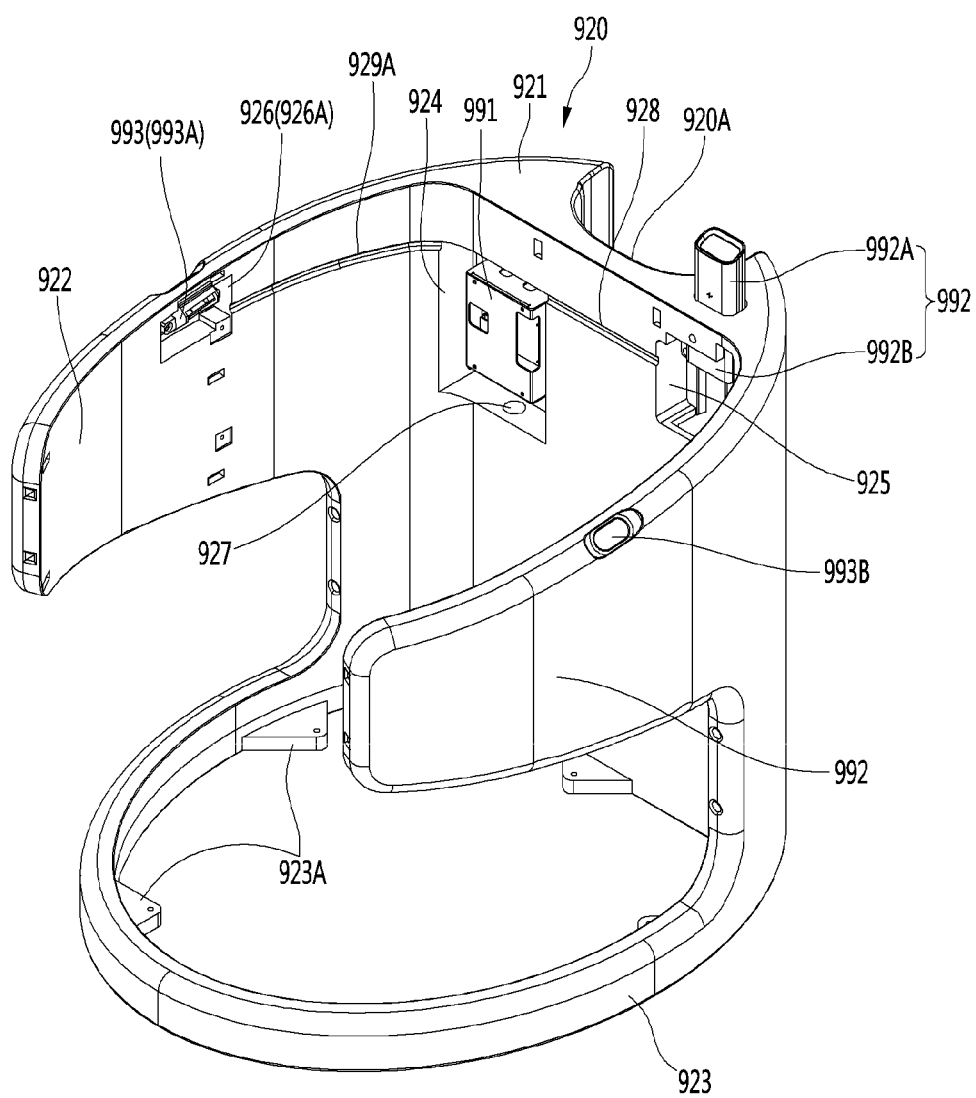

[Figure 16]
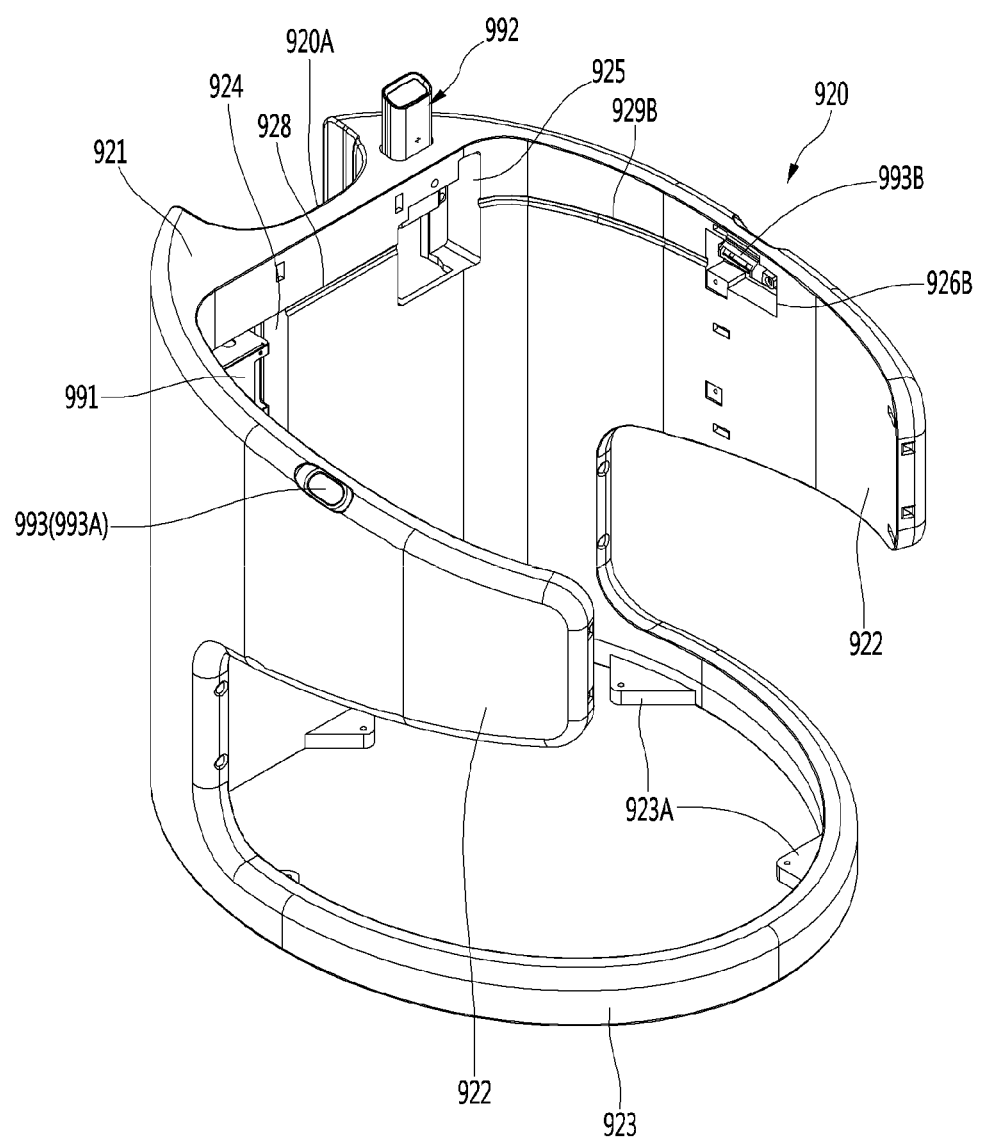

[Figure 17]
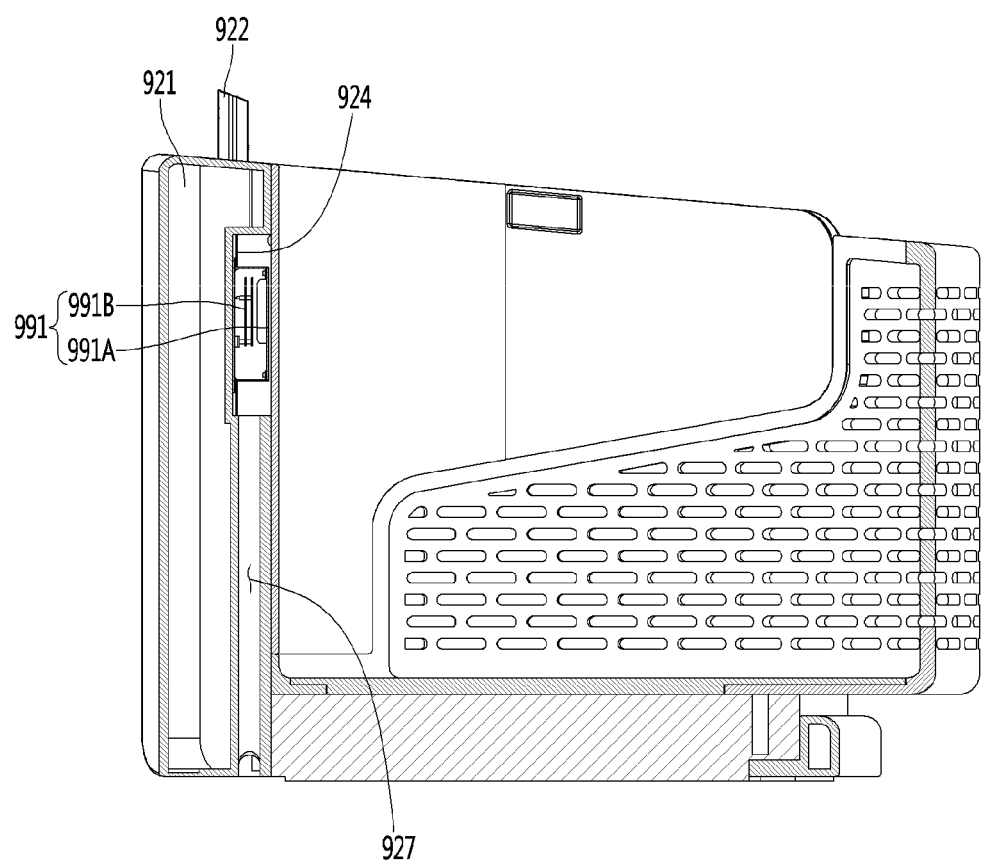

SERVICE MODULE AND MOBILE ROBOT HAVING THE SAME

CROSS REFERENCE TO RELATED APPLICATIONS

This application is the National Phase of PCT International Application No. PCT/KR2019/000055, filed on Jan. 2, 2019, which is hereby incorporated by reference into the present application.

TECHNICAL FIELD

The present disclosure relates to a mobile robot capable of autonomous driving and a service module included therein.

BACKGROUND ART

Robots have been developed for industrial use to take part in factory automation. In recent years, the field of application of robots is expanding, and robots that can be used in daily life have been developed in addition to medical robots and aerospace robots.

The robots for daily life provide a specific service (e.g., shopping, serving, conversation, cleaning, or the like) in response to a user's command.

However, an existing robot for daily life is designed to provide only a specific service, and thus there is a problem in that utilization is not high compared to costs invested in developing the robot.

Accordingly, a need for a robot that can provide various services has recently emerged.

DISCLOSURE

Technical Problem

An object to be achieved by the present disclosure is to provide a service module capable of performing or assisting a slam function.

Another object to be achieved by the present disclosure is to provide a mobile robot in which a slam module included in a service module and a mobile module on which the service module is detachably mounted are electrically connected to each other.

Technical Solution

According to an embodiment of the present disclosure, a service module may include a main body having an accommodation space in which an article is accommodated; a slam module installed on an upper portion of the main body; and a wire guide groove defined in the main body to guide an electric wire connected to the slam module. The slam module has an upper end having a height lower than a height of a top surface of the main body.

The slam module may face in an inclined direction between a horizontally outward direction and a vertically upward direction of the main body.

The main body may include a recess defined at a boundary between a top surface and a peripheral surface thereof, and the recess may be defined at a position corresponding to the slam module.

The recess may include an inclined portion having an opening defined therein and configured to face in an inclined direction between a horizontally outward direction and a vertically upward direction of the main body; a front extension connected to a front edge of the inclined portion and connected to a top surface and a peripheral surface of the main body; and a rear extension connected to a rear edge of the inclined portion and connected to the top surface and the peripheral surface of the main body, and the rear extension being spaced apart from the front extension. The front extension and the rear extension are gentler as they are closer to the inclined portion and are steeper as they are closer to the top surface of the main body.

The service module may further include a control box disposed in the main body and electrically connected to the slam module.

The main body may include an outer body having a slam module mounting portion on which the slam module is mounted; and an inner cover configured to cover the slam module mounting portion.

The inner cover has a slam module avoiding portion configured to avoid interference with the slam module.

The outer body may include a front body; and a side body extending rearward from both side edges of the front body. The slam module mounting portion is defined in the side body.

The service module may further include a control box electrically connected to the slam module. The outer body has a control box mounting portion on which the control box is mounted.

The wire guide groove may be defined in the outer body, and the wire guide groove may communicate the slam module mounting portion and the control box mounting portion The inner cover may cover the control box mounting portion and the wire guide groove.

The outer body may include a wire guide portion defined to pass through the control box mounting portion downward; and a lower recess recessed rearward from a front portion of the outer body, the lower recess communicating with the wire guide portion.

The outer body may be formed with a connecting groove configured to communicate the wire guide portion and the lower recess in a bottom surface thereof.

According to an embodiment of the present disclosure, a mobile robot may include a mobile module including a driving unit, and a service module detachably mounted on the mobile module. The service module may include a main body formed with an accommodation space in which an article is accommodated; a slam module installed on an upper portion of the main body; and a wire guide groove defined in the main body to guide an electric wire connected to an interior of the mobile module to the slam module. The slam module may have an upper end having a height lower than a height of a top surface of the main body.

The mobile module may include a body provided with the driving unit; a display unit disposed on an upper side of a front portion of the body, extending vertically, and positioned in front of the service module; and a module support plate disposed above the body to support the service module on a lower side.

The main body may have a guide groove into which at least a portion of the display unit is fitted.

The main body may include a wire guide portion configured to guide an electric wire connected to an interior of the main body; and a lower recess recessed rearward from a lower portion of a front portion of the main body, the lower recess communicating with the wire guide portion.

The display unit may include a lower opening portion configured to communicate with an interior of the body; and a rear opening portion configured to communicate the lower recess.

The display unit may include a shutter configured to open and close the rear opening portion.

The display unit may be provided with a shutter guide configured to guide raising and lowering movements of the shutter.

Advantageous Effects

According to the preferred embodiment of the present disclosure, the slam module may be included in a service module on which the mobile module is mounted. Accordingly, the service module has an advantage capable of performing or assisting the slam function.

In addition, the service module may be formed with a wire guide groove for guiding an electric wire connected to the slam module. Accordingly, it is possible that the slam module is electrically connected to an external component (mobile module) of the service module.

In addition, a height of the upper end of the slam module may be lower than the height of the top surface of the main body. As a result, the appearance of the service module may be improved in design because the slam module does not protrude upward from the main body. In addition, the risk of damage or breakage of the slam module may be reduced.

In addition, the slam module may face in an inclined direction between the horizontally outward direction and the vertically upward direction of the main body. Accordingly, a range that the slam module is able to perform sensing on may be relatively widened.

In addition, a recess is formed at the boundary between the top surface and the peripheral surface of the main body, and the recess may be formed at a position corresponding to the slam module. Accordingly, the slam module may be disposed adjacent to the upper end of the service module, and the user may easily recognize an installation position of the slam module.

Further, the recess may include an inclined portion. Accordingly, the slam module may be easily disposed to face in the inclined direction.

In addition, the front extension and the rear extension may be gentler as they are closer to the inclined portion and steeper as they are closer to the top surface of the main body. Accordingly, the size of the recess may be made compact.

In addition, the control box may be embedded in the main body and be electrically connected to the slam module. Accordingly, the control box included in the service module may control the slam module.

In addition, the inner cover may cover the slam module mounting portion. Accordingly, the inner cover may protect the slam module.

In addition, the slam module avoiding portion that avoids interference with the slam module may be formed in the inner cover. Thus, when the inner cover covers the inner periphery of the outer cover, the inner cover may not interfere with the slam module.

In addition, the slam module mounting portion may be formed in the side body of the outer body. That is, the slam module may be positioned in a side portion of the service module. Accordingly, it is possible to prevent the slam module from being blocked by the display unit of the mobile module.

In addition, the wire guide groove may communicate the slam module mounting portion and the control box mounting portion. Accordingly, the slam module and the control box may be easily connected by an electric wire.

In addition, the inner cover may cover the control box mounting portion. Accordingly, the inner cover may protect the control box.

In addition, the inner cover may cover the wire guide groove. As a result, the service module may be improved in design because the electric wire is not exposed.

In addition, the outer body may be formed with a wire guide portion communicating with the control box mounting portion and a lower recess communicating with the wire guide portion. Thus, an electric wire inside the display unit of the mobile module may be connected to the control box by passing through the lower recess and the wire guide portion. That is, the interior of the display unit and the interior of the service module may be easily connected by an electric wire.

In addition, the connecting groove communicating the wire guide portion and the lower recess may be formed in the bottom surface of the outer body. Accordingly, the size of the lower recess may be made compact, and the position of the wire guide portion may be designed relatively freely.

In addition, the mobile module may include a module support plate that supports the service module from the lower side. Thus, the service module may be stably mounted on the module support plate.

In addition, the guide groove into which the display unit of the mobile module is fitted may be formed in the main body of the service module. Thus, the mounting position of the service module may be guided.

In addition, the lower opening portion communicating with the interior of the main body may be formed in the display unit. In addition, the rear opening portion communicating with the lower recess of the service module may be formed in the display unit. Accordingly, the interior of the body and the interior of the service module may easily communicate with each other, and an electric wire may connect the interior of the body and the interior of the service module.

In addition, the shutter may open and close the rear opening portion. Accordingly, the rear opening portion may be closed by the shutter when the service module is not mounted to the mobile module. Therefore, foreign matter or the like may be prevented from entering the rear opening portion. In addition, the appearance of the mobile module may be improved in design.

In addition, the shutter guide for guiding the raising of the shutter may be provided in the display unit. Accordingly, the rear opening portion may be opened and closed reliably by the raising operation of the shutter.

DESCRIPTION OF DRAWINGS

FIG. 1 is a perspective view of a mobile module according to an embodiment of the present disclosure.

FIG. 2 is a perspective view of a mobile robot according to an embodiment of the present disclosure.

FIG. 3 is an exploded perspective view of a mobile module according to an embodiment of the present disclosure.

FIG. 4 is a cross-sectional view taken along line A-A' in FIG. 1.

FIG. 5 is a perspective view of a display unit and a module support plate according to an embodiment of the present disclosure as viewed from the rear side.

FIG. 6 is a bottom view of a display unit and a module support plate according to an embodiment of the present disclosure.

FIG. 7 is a view showing the interior of a display unit according to an embodiment of the present disclosure.

FIG. 8 is a view showing a shutter and a shutter guide according to an embodiment of the present disclosure.

FIG. 9 is a perspective view of a service module according to an embodiment of the present disclosure.

FIG. 10 is a bottom view of a service module according to an embodiment of the present disclosure.

FIG. 11 is an enlarged view showing a slam module mounted on a service module and its surroundings according to an embodiment of the present disclosure.

FIG. 12 is a cross-sectional view of a slam module mounted on a service module according to an embodiment of the present disclosure.

FIG. 13 is an exploded perspective view of a main body according to an embodiment of the present disclosure.

FIG. 14 is an exploded perspective view of a front module according to an embodiment of the present disclosure.

FIG. 15 is a view of an outer body according to an embodiment of the present disclosure as viewed in one direction.

FIG. 16 is a view of the outer body according to the embodiment of the present disclosure as viewed in another direction.

FIG. 17 is a cross-sectional view showing a wire guide portion formed in a service module according to an embodiment of the present disclosure.

MODE FOR INVENTION

Hereinafter, specific embodiments of the present disclosure will be described in detail with reference to the drawings.

FIG. 1 is a perspective view of a mobile module according to an embodiment of the present disclosure, FIG. 2 is a perspective view of a service module mounted on a mobile module according to an embodiment of the present disclosure, and FIG. 3 is an exploded perspective view of a mobile module according to an embodiment of the present disclosure.

A mobile robot according to an embodiment of the present disclosure may include a mobile module 1 and a service module M detachably mounted on the mobile module 1.

A mobile module 1 according to the embodiment of the present disclosure may include a body 100, a driving unit 240, a module support plate 400, display units 500 and 600, and a rotation mechanism 700.

The body 100 may constitute the body portion of the mobile module 1.

A length of the body 100 in the front-rear direction may be longer than a width of the body 100 in the left-right direction. As an example, the cross-section of the body 100 in a horizontal direction may have an approximately elliptical shape.

The body 100 may include an inner module 200 and a housing 300 surrounding the inner module 200.

The inner module 200 may be positioned inside the housing 300. The driving unit 240 may be provided with the inner module 200 in a lower portion thereof.

The inner module 200 may include multiple plates and multiple frames. In more detail, the inner module 200 may include a lower plate 210, an upper plate 220 positioned above the lower plate 210, and a top plate 230 positioned above the upper plate 220. In addition, the inner module 200 may further include a plurality of lower supporting frames 250 and a plurality of upper supporting frames 260.

The lower plate 210 may form a bottom surface of the body 100. The lower plate 210 may be referred to as a base plate. The lower plate 210 may be horizontal. The lower plate 210 may be provided with the driving unit 240.

The upper plate 220 may be spaced apart upward from the lower plate 210. The upper plate 220 may be referred to as a middle plate. The upper plate 220 may be horizontal. The upper plate 220 may be positioned between the lower plate 210 and the top plate 230 in the vertical direction.

The lower supporting frame 250 may be positioned between the lower plate 210 and the upper plate 220. The lower supporting frame 250 may be formed to extend vertically. The lower supporting frame 250 may support the upper plate 220 from the lower side.

The top plate 230 may form a top surface of the body 100. The top plate 230 may be spaced upward from the upper plate 220.

The upper supporting frame 260 may be positioned between the upper plate 220 and the top plate 230. The upper supporting frame 260 may be formed to extend vertically. The upper supporting frame 260 may support the top plate 230 from the lower side.

The housing 300 may form an outer peripheral surface of the main body 100. A space in which the inner module 200 is disposed may be formed inside the housing 300. The top and bottom surfaces of the housing 300 may be opened.

The housing 300 may surround the edges of the lower plate 210, the upper plate 220, and the top plate 230. In this case, an inner periphery of the housing 300 may be in contact with the edges of the lower plate 210, the upper plate 220, and the top plate 230, but is not limited thereto.

A front open portion OP1 may be formed in a front portion of the housing 300. The front open portion OP1 may be opened toward the front. The front open portion OP1 may be formed to extend along the peripheral direction of the housing 300. A front lidar 275A may detect an obstacle or the like positioned in front of the mobile module 1 through the front open portion OP1 or perform mapping for a front region of the mobile module 1.

A rear open portion OP2 may be formed in a rear portion of the housing 300. The rear open portion OP2 may be opened toward the rear. The rear open portion OP2 may be formed to extend along the peripheral direction of the housing 300. The rear lidar 275B (see FIG. 4) may detect an obstacle or the like positioned behind the mobile module 1 through the rear open portion OP2 or perform mapping for a rear region of the mobile module 1. In addition, a back cliff sensor 276B (see FIG. 4) may detect a state of a floor surface behind the mobile module 1 through the rear open portion OP2.

An upper open portion OP3 may be formed in the front portion of the housing 300. The upper open portion may be formed above the front open portion OP1. The upper open portion OP3 may be opened toward the front side or a front lower side. The cliff sensor 276A may detect the state of the floor surface in front of the mobile module 1 through the upper open portion OP3.

A plurality of openings 303A may be formed in the housing 300. In more detail, the opening 303A may be formed in the top portion of the housing 300. The plurality of openings 303A may be spaced apart from each other along the peripheral direction of the housing 300. Each ultrasonic sensor 310 may detect an object around the mobile module 1 through the opening 303A.

The housing 300 may include a material having a first thermal conductivity, and the inner module 200 may include a material having a second thermal conductivity higher than the first thermal conductivity. In more detail, at least one of the lower plate 210, the upper plate 220, the top plate 230, the lower supporting frame 250 and the upper supporting frame 260 may include a material having a second thermal conductivity higher than the first thermal conductivity.

As an example, the housing 300 may include an injection plastic material, and at least one of the lower plate 210, the upper plate 220, the top plate 230, the lower supporting frame 250 and the upper supporting frame 260 may include a metal material such as aluminum.

Accordingly, a heat dissipation part disposed in the inner module 200 may be smoothly dissipated by conduction while preventing the housing 300 defining the appearance of the body 100 from becoming hot.

The driving unit 240 may enable the mobile module 1 to move. The driving unit 240 may be provided below the body 100. In more detail, the driving unit 240 may be provided in the lower plate 210.

On the other hand, the module support plate 400 may be mounted on the top surface of the body 100. The module support plate 400 is preferably a horizontal plate shape, but is not limited thereto.

Like the body 100, the module support plate 400 may be formed to extend such that a length in the front-rear direction is longer than a width in the left-right direction.

The module support plate 400 may support a service module M from the lower side. That is, the service module M may be seated and supported on the module support plate 400.

The service module M may be detachably mounted to the module support plate 300.

The service module M may be a transport object carried by the mobile module 1, and its type is not limited. Therefore, there is an advantage that it is possible to mount and use different service modules M to the same mobile module 1.

As an example, the service module M may be a cart capable of receiving articles. In this case, the mobile module 1 equipped with a cart may be used in a mart, and a user has an advantage of not having to push the cart directly.

The top surface of the body 100, that is, the top plate 230 may be provided with at least one of at least one module guide 231 configured to guide the installation position of the service module M and at least one module fastening portion 232 fastened to the service module M.

The module guide 231 and the module fastening portion 232 may protrude upward from the top plate 230.

The module guide 231 may pass through a sub through hole 411 formed in the module support plate 400, and prevent the service module M from shaking in the horizontal direction while guiding the installation position of the service module M.

The module fastening portion 232 may pass through the sub-opening hole 412 formed in the module support plate 400 and be fastened to the service module M. Therefore, the service module M may be firmly mounted to the upper side of the module support plate 400.

The module guide 231 and the module fastening portion 232 may also be used as handles when carrying the mobile module 1.

Meanwhile, the display unit 500 and 600 may be positioned above the front portion of the main body 100. The display units 500 and 600 may be disposed to extend vertically. A height HD of the display unit 500 and 600 (see FIG. 4) may be higher than a height HB of the body 100.

In more detail, the display unit 500 and 600 may include a body display unit 500 and a head display unit 600.

The body display unit 500 may be integrally formed with the module support plate 400. In this case, the body display unit 500 may be formed to extend upward from the front end of the module support plate 400. However, it is of course possible that the body display unit 500 and the module support plate 400 are formed of separate members.

A height of the body display unit 500 may be higher than a height of the body 100.

The body display unit 500 may include a body display 540 provided on a front surface thereof. The body display 540 may function as an output unit on which an image or video is displayed. At the same time, the body display 540 may include a touch screen to function as an input unit capable of enabling touch input.

The body display unit 500 may be positioned in front of the service module M mounted on the module support plate 400. In this case, a groove corresponding to a shape of the body display unit 500 may be formed in the front portion of the service module M, and the body display unit 500 may be fitted into the groove. That is, the body display unit 500 may guide a mounting position of the service module M.

The head display unit 600 may be positioned above the body display unit 500. The head display unit 600 may be rotatably connected to an upper portion of the body display unit 500.

In more detail, the head display unit 600 may include a neck housing 620 rotatably connected to the body display unit 500. The rotation mechanism 700 may rotate the head display unit 600 through the interior of the neck housing 620.

The head display unit 600 may include a head display 640 provided on a front surface thereof. The head display 600 may face the front side or a front upper side. The head display 640 may display an image or video depicting a human expression. Accordingly, the user may feel that the head display unit 600 is similar to a human head.

The head display unit 600 may rotate a certain range (for example, 180 degrees) left and right with respect to the vertical axis of rotation, like a human head.

The rotation mechanism 700 may rotate the head display unit 600 with respect to the body display unit 500. The rotation mechanism 700 may include a rotating motor and a rotating shaft rotated by the rotating motor. The rotating motor may be disposed inside the body display unit 500, and the rotating shaft may extend from the interior of the body display unit 500 into the neck housing 620 and be connected to the head display unit 600.

FIG. 4 is a cross-sectional view taken along line A-A' in FIG. 1.

A battery 271 and a control box 272 may be embedded in the body 100. Further, the body 100 may include a front lidar 275A and a rear lidar 275B embedded therein.

Electric power for the operation of the mobile module 1 may be stored in the battery 271.

The battery 271 may be supported by the upper plate 220 of the inner module 200. The battery 271 may be disposed between the upper plate 220 and the top plate 230.

The battery 271 may be disposed eccentrically from the interior of the body 100 to the rear.

Also, the display unit 500 and 600 may be supported by the top plate 230 of the inner module 200. The display unit 500 and 600 may be disposed above the front portion of the top plate 230. The body display unit 400 may not overlap the battery 271 in the vertical direction.

With the above configuration, the load of the battery 271 and the load of the body display unit 500 and the head display unit 600 may be balanced. Thereby, it is possible to prevent the mobile module 1 from being tilted or overturned back and forth.

The control box 272 may be disposed in front of the battery 271. The control box 272 may be supported by the upper plate 220 of the inner module 200. The control box 272 may be disposed between the upper plate 220 and the top plate 230. At least a portion of the control box 272 may overlap the display unit 500 and 600 vertically.

The control box 272 may include a box-shaped boxing case and a controller provided in the boxing case. A plurality of through holes may be formed in the boxing case to dissipate internal heat of the control box 272. The controller may include a PCB, and may control the overall operation of the mobile module 1.

Since the control box 272 is positioned in front of the battery 271, the load of the battery 271 eccentric to the rear and the load of the control box 272 may be balanced. Thereby, it is possible to prevent the mobile module 1 from being tilted or overturned back and forth.

The front lidar 275A and the rear lidar 275B may be provided in the front and rear portions of the body 100, respectively.

LIDAR is a sensor capable of detecting a distance and various properties of an object by radiating a laser beam to a target and the front lidar 275A and the rear lidar 275B may detect surrounding objects, terrain features, and the like. A controller of the control box 272 may receive information detected by the front lidar 275A and the rear lidar 275B, and perform 3D mapping or control the driving unit 240 to avoid an obstacle based on the information.

As described above, the front lidar 275A may detect information on a front region of the mobile module 1 through the front open portion OP1 formed in a front portion of the body 100. The rear lidar 275B may detect information on a rear region of the mobile module 1 through the rear open portion OP2 formed in a rear portion of the body 100.

At least a portion of the front lidar 275A may be positioned below the control box 272.

The front lidar 275A and the rear lidar 275B may be positioned at the same height inside the body 100.

In more detail, a vertical distance H1 from the bottom surface of the body 100 to the front lidar 275A may be equal to a vertical distance H2 from the bottom surface of the body 100 to the rear lidar 275B.

In addition, the front lidar 275A and the rear lidar 275B may be disposed inside the body 100 at a lower position than the battery 271.

The front lidar 275A and the rear lidar 275B may be supported by the lower plate 210 of the inner module 200. The front lidar 275A and the rear lidar 275B may be disposed between the lower plate 210 and the upper plate 220.

In more detail, a vertical distance H3 from the bottom surface of the body 100 to the battery 271 may be greater than the vertical distance H1 from the bottom side of the body 100 to the front lidar 275A. In addition, the vertical distance H3 from the bottom surface of the main body 100 to the battery 271 may be greater than the vertical distance H2 from the bottom surface of the body 100 to the rear lidar 275B.

As a result, a space inside the body 100 may be effectively utilized as compared with a case where the front lidar 275A and the rear lidar 275B are disposed at the same height as the battery 271. Therefore, the size of the body 100 may be made compact.

A cliff sensor 276A and a back cliff sensor 276B may be embedded in the body 100.

The cliff sensor 276A and the back cliff sensor 276B may be supported by being suspended from the top plate 230 of the inner module 200. The cliff sensor 276A and the back cliff sensor 276B may be disposed between the upper plate 220 and the top plate 230.

The cliff sensor may detect a state of the floor surface and the presence or absence of a cliff by transmitting and receiving infrared rays. That is, the cliff sensor 276A and the back cliff sensor 276B may detect the state of the floor surface of the front and rear regions of the mobile module 1 and the presence or absence of a cliff. The controller of the control box 272 may receive information detected by the cliff sensor 276A and the back cliff sensor 276B, and control the driving unit 240 such that the mobile module 1 avoids cliffs based on the information.

As described above, the cliff sensor 276A may detect the state of the floor surface in front of the mobile module 1 through the upper open portion OP3. The back cliff sensor 276B may detect the state of the floor surface behind the mobile module 1 through the rear open portion OP2.

The cliff sensor 276A may be disposed above the front lidar 275A. The back cliff sensor 276B may be disposed above the rear lidar 276B.

At least a portion of the cliff sensor 276A may be positioned above the control box 272. The back cliff sensor 276B may be positioned behind the battery 271.

That is, the cliff sensor 276A may be disposed within the body 100 at a higher position than the back cliff sensor 276B.

In more detail, a vertical distance H4 from the bottom surface of the body 100 to the cliff sensor 276A may be greater than a vertical distance H5 from the bottom surface of the body 100 to the back cliff sensor 276B.

As a result, a space inside the body 100 may be efficiently utilized as compared with a case where the cliff sensor 276A is positioned in front of the control box 272. Therefore, the body 100 may be compact with respect to the front-rear direction.

Meanwhile, a wiring disconnect switch 277 may be embedded in the body 100. The wiring disconnect switch 277 may cut off the power of the mobile module 1 to immediately stop driving of the mobile module 1.

The wire disconnect switch 277 may be positioned behind the front lidar 275A. The wire blocking switch 277 may be supported by the lower plate 210 of the inner module 200.

FIG. 5 is a perspective view of a display unit and a module support plate according to an embodiment of the present disclosure as viewed from the rear side, FIG. 6 is a bottom view of a display unit and a module support plate according to an embodiment of the present disclosure, FIG. 7 is a view showing the interior of a display unit according to an embodiment of the present disclosure, and FIG. 8 is a view showing a shutter and a shutter guide according to an embodiment of the present disclosure.

As described above, the display unit 500 and 600 may include a body display unit 500 extending vertically and a head display unit 600 rotatably connected to an upper portion of the body display unit 500.

A rear opening portion 530A may be formed in a rear surface of the body display unit 500. In more detail, the rear opening portion 530A may be formed in a lower rear surface of the body display unit 500. An electric wire connected to the service module M (see FIG. 2) may be connected to the interior of the body display unit 500 through the rear opening portion 530A.

Hereinafter, the electric wire may encompass a configuration for electrical connection, such as wire, cable, and harness.

The body display unit 500 may include a shutter 550 that opens and closes the rear opening portion 530A.

The shutter 550 may be raised to open the rear opening portion 530A or lowered to close the rear opening portion 530B. In this case, a shutter guide 590 for guiding the opening and closing operation of the shutter 550 may be disposed inside the body display unit 500.

The shutter guide 590 may be positioned in a lower portion of the body display unit 500.

The shutter guide 590 may be formed to extend vertically. A pair of shutter guides 590 may be provided to be spaced apart from each other. One of the shutter guides 590 may guide a left side portion of the shutter 550, and the other of the shutter guides 590 may guide a right side portion of the shutter 550.

In more detail, protrusions protruding outward may be formed on the left and right sides of the shutter 550. During the opening and closing operation of the shutter 550, the protrusion may move along the guide groove 590A formed in the inner surface of each shutter guide 590.

In this case, the guide groove 590A may include a vertical portion 590B formed to be vertical and an inclined portion 590C connected to the lower end of the vertical portion 590B and inclined backward. Accordingly, in the opening operation of the shutter 550, the shutter 550 may be raised upward along the vertical portion 590C after being moved backward along the inclined portion 590C. Thus, the shutter 550 may be smoothly raised without being caught by an inner periphery of the rear opening portion 530A.

Conversely, in the closing operation of the shutter 550, the shutter 550 may be moved forward along the inclined portion 590C after being lowered along the vertical portion 590B. Thus, the shutter 550 may reliably close the rear opening portion 530A.

A handle 550A may be formed on the shutter 550. The handle 550A may be formed to protrude rearward from the lower rear surface of the shutter 550.

An operator may hold the handle 550A and push the shutter 550 upward to open the rear opening 530 and connect an electric wire connected to the service module M to the interior of the rear opening portion 530A. Thereafter, the operator may mount the service module M on the module support plate 400.

Conversely, the operator may separate the service module M from the module support plate 400 and the electric wire connected to the service module M from the service module M. Thereafter, the operator may hold the handle 550A and push the shutter 550 downward to block the rear opening portion 530A.

A lower opening portion 500B may be formed in a lower portion of the body display unit 500. The lower opening portion 500B may be formed by opening a bottom surface of the body display unit 500.

The interior of the body 100 and the interior of the body display unit 500 may communicate with each other by the lower opening portion 500B. An electric wire connected to the body 100 may be connected to the interior of the body display unit 500 through the lower opening portion 500B.

FIG. 9 is a perspective view of a service module according to an embodiment of the present disclosure, and FIG. 10 is a bottom view of a service module according to an embodiment of the present disclosure.

A service module M may include a main body 900 formed with an accommodation space S1 in which an article is accommodated. A top surface of the accommodation space S1 may be opened, and a user may easily put an article or the like into the accommodation space S1.

A guide groove 920A may be formed to be recessed rearward from a front surface of the main body 900. The guide groove 920A may be formed to extend vertically from the top surface to the bottom surface of the main body 900. The guide groove 920A may correspond to the shape of the body display unit 500 (see FIG. 5) described above. When the service module M is mounted on the mobile module 1, at least a portion of the body display unit 500 may be fitted into the guide groove 920A. Thus, the mounting position of the service module M may be guided by the body display unit 500.

A lower recess 920B may be formed in a lower portion of the guide groove 920A. The lower recess 920B may be formed by being recessed further from the guide groove 920A. The lower recess 920B may correspond to and communicate with the rear opening portion 530A (see FIG. 5) formed in the rear surface of the body display unit 500.

A connecting groove 927A in communication with the lower recess 920B may be formed in a bottom surface of the front portion of the main body 900. In addition, the main body 900 may be formed with a wire guide portion 927 that is in communication with the wire guide groove 920A and is formed to extend vertically. However, the present disclosure is not limited thereto, and the wire guide portion 927 may be formed to directly communicate with the lower recess 920B. In this case, the connecting groove 927A may not be formed.

By the above configuration, an electric wire exiting through the rear opening portion 530A from the interior of the body display unit 500 may be connected to the interior of the service module M through the connecting groove 927A communicating with the lower recess 920B, and the wire guide portion 927.

A guide insertion portion 961 and a fastening hole 962A may be formed in the bottom surface of the main body 900.

The guide insertion portion 961 may be formed by being recessed upward from the bottom surface of the main body 900.

A module guide 231 (see FIG. 3) provided in the top surface of the body 100 of the mobile module 1 may be inserted into the guide insertion portion 961. In more detail, the module guide 231 may be inserted into the guide insertion portion 961 by passing through a sub through hole 411 formed in the module support plate 400. Thereby, the mounting position of the service module M may be guided with respect to the mobile module 1 and the shaking of the service module M in the horizontal direction may be prevented.

The fastening hole 962A may be formed by passing through the bottom surface of the main body 900 vertically.

The fastening hole 962A may be fastened to the module fastening portion 232 (see FIG. 3) provided in the top surface of the body 100 of the mobile module 1. In more detail, the module fastening portion 232 may face the fastening hole through a sub-opening hole 412 formed in the module support plate 400. In this case, a fastening member such as a screw may pass through the fastening hole and may be fastened to the module fastening portion 231 by passing through the sub-opening hole 412. Thus, the service module M may be firmly mounted on the mobile module 1.

Meanwhile, the service module M may include a scanner 992 mounted on the main body 900.

The scanner 920 may be positioned to face the front side. In more detail, the scanner 920 may be provided to protrude upward from the top surface of the front portion of the main body 900. However, the present disclosure is not limited thereto, and the mounting position of the scanner 920 may be changed as necessary.

The scanner 920 may read data information of a preset type. In one example, the scanner 920 may read data information of at least one of a barcode and a quick response code (QR code).

For example, the mobile module 1 may be used in a mart and the service module M may function as a cart capable of holding articles. In this case, when a user brings a barcode printed on an article to the scanner 920, the name and price information of the article may be recognized.

Meanwhile, the service module M may include a slam module 993 mounted on the main body 900. The slam module 993 may include a camera. The slam module 993 may be a vision sensor or an optical sensor.

The mobile robot may perform a SLAM (Simultaneous Localization and Mapping) operation using the information detected by the slam module 993. That is, the mobile robot which is traveling may measure its own position using the information detected by the slam module 993 and simultaneously create a map of a surrounding environment.

The slam module 993 may be installed on the upper portion of the main body 900.

A plurality of slam modules 993 may be provided. In one example, the service module M may include a pair of slam modules 993 respectively provided on the left and right sides of the main body 900.

FIG. 11 is an enlarged view showing a slam module mounted on a service module and its surroundings according to an embodiment of the present disclosure, and FIG. 12 is a cross-sectional view of a slam module mounted on a service module according to an embodiment of the present disclosure.

The slam module 993 may face in an inclined direction B between a vertically upward direction V and a horizontally outward direction H with respect to the service module M. In one example, the slam module 993 mounted on the left side of the main body 900 may face in the inclined direction between the vertically upward direction and the horizontally left direction, and the slam module 993 mounted on the right side of the main body 900 may face in the inclined direction between the vertically upward direction and the horizontally right direction.

A recess 922A may be formed at a boundary between a top surface 900A and peripheral surface 900B of the main body 900. That is, the recess 922A may connect the top surface 900A and the peripheral surface 900B of the main body 900.

The recess 922A may be formed at a position corresponding to the slam module 993.

In more detail, an opening 992E may be formed in the recess 922A, and the slam module 993 may face in the inclined direction B through the opening 992E.

In more detail, the recess 922A may include an inclined portion 922B, a front extension 922C, and a rear extension 922D.

The inclined portion 922B may face in a direction between the vertically upward direction V and the horizontally outward direction H. In this case, the direction in which the inclined portion 922B faces is preferably parallel to the inclined direction B in which the slam module 993 faces.

The inclined portion 922B may be connected to the top surface 900A and the peripheral surface 900B of the main body 900. An opening 922E may be formed in the inclined portion 922B.

The front extension 922C may be connected to a front-side edge of the inclined portion 922B. The front extension 922C may be connected to the top surface 900A and the peripheral surface 900B of the main body 900.

The rear extension 922D may be connected to a rear-side edge of the inclined portion 922B. The rear extension 922D may be spaced apart from the front extension 922C. The rear extension 922C may be connected to the top surface 900A and the peripheral surface 900B of the main body 900.

The front extension 922C and the rear extension 922D may be formed to be gentler as they are closer to the inclined portion 922B, and steeper as they are closer to the top surface 900A of the main body 900.

A height of the upper end of the slam module 993 may be lower than a height of the top surface 900A of the main body 900. That is, a predetermined height difference "g" may exist between the upper end of the slam module 993 and the top surface 900A of the main body 900.

Thus, the slam module 993 may be stably mounted on the main body 900, and the appearance of the service module M may be improved in design. In addition, since the slam module 993 does not protrude from the main body 900, fear of damage due to impact may be reduced.

FIG. 13 is an exploded perspective view of a main body according to an embodiment of the present disclosure.

The main body 900 may include a front module 910 and a rear module 940.

The scanner 992 and the slam module 993 described above may be mounted on the front module 910. In addition, the guide groove 920A and the lower recess 920B described above may be formed in a front surface of the front module 910.

The rear module 940 may be mounted on the front module 910 on the rear side of the front module 910. The rear module 940 may form the accommodation space S1 (see FIG. 9) of the service module M in cooperation with the front module 910.

The rear module 640 may include a basket 950, a module base 960, and a base cover 970.

The basket 950 may include a rear basket 950A and a pair of side baskets 950B extending toward the front from both side edges of the rear basket 950A.

The rear basket 950A may define an appearance of a rear portion of the service module M. Each of the side baskets 950B may define an appearance of a lower side portion of the service module M.

A height of the rear basket 950A may be formed higher than a height of the side basket 950B. The lower end of the rear basket 950A and the lower end of the side basket 950B are preferably continuously connected without being stepped.

A plurality of through holes may be formed in the basket 940. The user may easily check articles contained in the accommodation space S1 (see FIG. 9) through the plurality of through holes.

The module base 960 may be connected to the basket 950 at the lower side of the basket 950. The module base 960 may be mounted on the rear module mounting portion 923 included in the front module 910.

The guide insertion portion 961 (see FIG. 10) described above may be formed in the bottom surface of the module base 960. The guide insertion portion 961 may be formed by passing through the module base 960 in the vertical direction.

In addition, the fastening hole 962A (see FIG. 10) described above may be formed in the bottom surface of the module base 960. In more detail, a fastening groove (not shown) may be formed to be recessed downward from the top surface of the module base 960, and the fastening hole 962A may be formed by passing through from the fastening groove to the bottom surface of the module base 960. Accordingly, a portion of the upper portion of the fastening member passing through the fastening hole may be positioned in the fastening groove.

The base cover 970 may cover the module base 960 from the upper side. The base cover 670 may cover the guide insertion portion 961 formed in the module base 960, the fastening groove, and the fastening member positioned in the fastening groove from the upper side.

The base cover 970 may form a bottom surface of the accommodation space S1 (see FIG. 9).

FIG. 14 is an exploded perspective view of a front module according to an embodiment of the present disclosure, FIG. 15 is a view of an outer body according to an embodiment of the present disclosure as viewed in one direction, FIG. 16 is a view of the outer body according to the embodiment of the present disclosure as viewed in another direction, and FIG. 17 is a cross-sectional view showing a wire guide portion formed in a service module according to an embodiment of the present disclosure.

The front module 910 may include an outer body 920 and an inner cover 930 covering the inner periphery of the outer body 920.

The outer body 920 may include a front body 921 and a pair of side bodies 922. The outer body 920 may further include a rear module mounting portion 923 on which the rear module 940 (see FIG. 13) is mounted.

The front body 921 may define a front appearance of the service module M. Each of the side bodies 922 may define an appearance of a side upper portion of the service module M.

The pair of side bodies 922 may extend rearward from side edges of the front body 921, respectively.

A height of the front body 921 may be formed higher than heights of the side bodies 922. The upper end of the front body 921 is preferably continuously connected to upper ends of the side bodies 922 without being stepped.

The lower ends of the side bodies 922 may be in contact with the upper ends of the side baskets 950B (see FIG. 13) described above.

The rear end of each of the side bodies 922 may come into contact with a portion where the side basket 950B is not formed in one side edge of the rear basket 950A. In addition, the front end of each of the side baskets 950B may come into contact with a portion where the side body is not formed in one side edge of the front body 921.

The inner cover 930 may cover the outer body 920 from the rear side.

The inner cover 930 may include a front cover 931 and a pair of side covers 932 extending rearward from both side edges of the front cover 931.

The front cover 931 may cover the rear surface of the front body 921. The front cover 931 may form a front portion of the inner periphery of the accommodation space S1 (see FIG. 9).

The side covers 932 may cover the inner surface of the side body 322. The side covers 932 may form side upper portions of the inner periphery of the accommodation space S1 (see FIG. 9).

The module base 960 (see FIG. 13) of the rear module 940 may be mounted on the rear module mounting portion 923. The rear module mounting portion 923 may surround the outer periphery of the module base 960. In this case, the upper end of the rear module mounting portion 923 may be in contact with the lower end of the basket 950 (see FIG. 13).

The rear module mounting portion 923 may be spaced apart from the side bodies 922.

One end of the rear module mounting portion 923 may be connected to the lower edge of one side of the front body 921 and the other end of the rear module mounting portion 923 may be connected to the lower edge of the other side of the front body 921.

The rear module mounting portion 923 may be formed with a base support portion 923A. The base support portion 923A may be formed to protrude inward from the inner periphery of the rear module 923. The base support portion 923A may support the module base 960 from the lower side.

A plurality of base support portions 923A may be provided. In this case, the plurality of base support portions 923A may be spaced apart from each other in the inner peripheral direction of the rear module mounting portion 923.

Meanwhile, a control box 991 may be embedded in the front module 910. In this case, the control box 272 (see FIG. 4) embedded in the mobile module 1 may be referred to as a main control box, and the control box 991 embedded in the service module M may be referred to as a sub control box.

Referring to FIG. 17, the control box 991 may include a box-shaped case 991A and a controller 991B provided inside the case 991A. The controller 991B may include a PCB and may be electrically connected to the scanner 992 and the slam module 993. In one example, the controller 991B may receive information detected by the scanner 992 and the slam module 993.

A control box mounting portion 924 on which the control box 991 is mounted may be formed in the outer body 920. In more detail, the control box mounting portion 924 may be formed to be recessed forward from the rear surface of the front body 921.

The outer body 920 may be formed with a wire guide portion 927 in communication with the control box mounting portion 924. The wire guide portion 927 may be formed to passing through vertically from the control box mounting portion 924 to the connecting groove 927A formed in the bottom surface of the outer body 920 That is, the wire guide portion 927 may communicate with the connecting groove 927A.

A lower recess 920B may be formed to be recessed rearward from the lower portion of the front portion of the outer body 920, and the wire guide portion 927 may communicate with the lower recess 920B through the connecting groove 927A.

Accordingly, an electric wire connected to the battery 271 (see FIG. 4) and the control box 272 (see FIG. 4) of the mobile module 1 may be inserted into the body display unit 500 through the lower opening portion 500B (see FIG. 6). The electric wire may pass through the rear opening portion 530A (see FIG. 5) of the body display unit 500, and then pass through the lower recess 920B, the connecting groove 927A, and the wire guide portion 927 of the outer body 920 sequentially to be introduced into the control box mounting portion 924. Accordingly, the electric wire may be connected to the control box 991. Accordingly, electrical connection between the mobile module 1 and the service module M may be easily achieved.

In addition, a scanner mounting portion 925 on which the scanner 992 is mounted may be formed in the outer body 920. In more detail, the scanner mounting portion 925 may be formed to be recessed forward from the rear surface of the front body 921.

A through portion 925A in communication with the scanner mounting portion 925 may be formed in the outer body 920. The through portion 925A may be formed to vertically pass through from the scanner mounting portion 925 to the top surface of the front body 921.

The scanner 992 may include a scanner body 992A protruding upward from the front body 921 through the through portion 925A and a mounting bracket 992B connected to the scanner body 992A and mounted in the scanner mounting portion 925.

The scanner mounting portion 925 may be spaced apart from the control box mounting portion 924. The control box mounting portion 924 may be further adjacent to one of the pair of side bodies 922, and the scanner mounting portion 925 may be further adjacent to the other one of the pair of side bodies 922.

A slam module mounting portion 926 on which the slam module 993 is mounted may be formed in the outer body 920. In more detail, the slam module mounting portion 926 may be formed to be recessed outward from the inner surface of the side body 922.

A pair of slam modules 993 are preferably provided on the left and right sides. In this case, the slam module mounting portion 926A formed in one side body 922 may be referred to as a first slam module mounting portion 926A. The slam module 993A mounted on the first slam module mounting portion 926A may be referred to as a first slam module 993A. In addition, the slam module mounting portion 926B formed in the other side body 922 may be referred to as a second slam module mounting portion 926B, and the slam module 993B mounted on the second slam module mounting portion 926B may be referred to as a second slam module 993B.

Wire guide grooves 928, 929A, and 929B for guiding an electric wire connected to the slam module 993 may be formed in the main body 910.

In more detail, a first wire guide groove 928 communicating the control box mounting portion 924 and the scanner mounting portion 925 may be formed in the outer body 920. The first wire guide groove 928 may guide an electric wire connecting the control box 991 and the scanner 992. The first wire guide groove 928 may be formed in the rear surface of the front body 921.

A second wire guide groove 929A communicating the control box mounting portion 924 and the first slam module mounting portion 926A may be formed in the outer body 920. The second wire guide groove 929A may guide an electric wire connecting the control box 991 and the first slam module 993A. A portion of the second wire guide groove 929A may be formed in the rear surface of the front body 921 and another portion may be formed in the inner surface of the side body 922.

A third wire guide groove 929B communicating with the scanner mounting portion 925 and the second slam module mounting portion 926B may be formed in the outer body 920. The third wire guide groove 929B may guide an electric wire connecting the scanner 992 and the second slam module 993B. A portion of the third wire guide groove 929B may be formed in the rear surface of the front body 921 and another portion may be formed in the inner surface of the side body 922.

In addition, the first wire guide groove 928 and the third wire guide groove 929B may guide an electric wire connecting the control box 991 and the second slam module 993B.

For example, when the scanner 992 is not included in the service module M and the scanner mounting portion 925 is not formed in the outer body 920, the first wire guide groove 928 and the third wire guide groove 929B may form a single wire guide groove connected to each other. The wire guide groove may communicate the control box mounting portion 924 and the second slam module mounting portion 926B.

The first wire guide groove 928, the second wire guide groove 929A, and the third wire guide groove 929B may have a generally straight line shape. Therefore, the length of an electric wire connecting components may be shortened, and bending of the electric wire may be prevented.

Meanwhile, the inner cover 930 may cover the control box mounting portion 924, the scanner mounting portion 925, and the slam module mounting portion 926. That is, the inner cover 930 may cover the control box 991, the mounting bracket 992B of the scanner 992, and the slam module 993.

In this case, a slam module avoiding portion 932A may be formed in the inner cover 930, more specifically, the side cover 932. The slam module avoiding portion 932A may be formed at a position corresponding to the slam module mounting portion 926. Accordingly, when the inner cover 930 covers the inner periphery of the outer cover 920, the inner cover 930 may not interfere with the slam module 993.

In addition, the inner cover 930 may cover the first wire guide groove 928, the second wire guide groove 929A, and the third wire guide groove 929B. As a result, an electric wire embedded in the service module M, more specifically, the front module 910 may not be exposed to the accommodation space S1 (see FIG. 9).

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

The invention claimed is:

1. A service module, comprising:
    a main body having an accommodation space configured to receive an article therein, the main body having an upper portion including a top surface of the main body;
    at least one Simultaneous Localization and Mapping (slam) module located at the upper portion of the main body, the upper end of the at least one slam module being located lower than the top surface of the main body by a predetermined gap;
    an electric wire having a first end connected to the at least one slam module; and a wire guide groove located in the main body to guide the electric wire connected to the at least one slam module, wherein the upper portion of the main body includes a peripheral surface extending from the top surface, and a recess located at a boundary between the top surface and the peripheral surface, wherein the at least one slam module is received in the recess, wherein the recess includes:
- an inclined portion having an opening, the inclined portion configured to face in an inclined direction between a horizontally outward direction and a vertically upward direction of the main body, the inclined portion having a front edge and a rear edge;
- a front extension connected to the front edge of the inclined portion and connected to the top surface and a peripheral surface extending from the top surface of the main body; and
- a rear extension connected to the rear edge of the inclined portion and connected to the top surface and the peripheral surface of the main body, the rear extension being spaced apart from the front extension, and wherein the front extension and the rear extension extend at an increasing angle from the inclined portion towards the top surface of the main body.

2. The service module of claim 1, wherein the at least one slam module is oriented to face in an inclined direction between a horizontally outward direction and a vertically upward direction of the main body.

3. The service module of claim 1, further comprising a control box located in the main body, the control box being electrically connected to the at least one slam module.

4. The service module of claim 1, wherein the main body includes:
- an outer body having a slam module mounting portion on which the at least one slam module is mounted; and
- an inner cover configured to cover the slam module mounting portion.

5. The service module of claim 4, wherein the inner cover has a slam module avoiding portion configured to avoid interference with the at least one slam module when the inner cover is connected to the outer body.

6. The service module of claim 4, wherein the at least one slam module includes a pair of slam modules spaced apart on opposite sides of the main body, and
wherein the outer body includes:
- a front body having a pair of side edges; and
- a pair of side bodies extending rearward from the pair of side edges of the front body, each side body having a slam module mounting body to receive a corresponding slam module of the pair of slam modules.

7. The service module of claim 4, further comprising a control box electrically connected to the at least one slam module,
wherein the outer body has a control box mounting portion on which the control box is mounted.

8. The service module of claim 7, wherein the wire guide groove is located in the outer body, and
wherein the wire guide groove is in communication with the slam module mounting portion and the control box mounting portion.

9. The service module of claim 8, wherein the inner cover is configured to cover the control box mounting portion and the wire guide groove.

10. The service module of claim 7, wherein the outer body includes:
- a wire guide portion extending downward from the control box mounting portion; and
- a lower recess recessed rearward from a front portion of the outer body, the lower recess being in communication with the wire guide portion.

11. The service module of claim 10, wherein the outer body includes:
- a bottom surface; and
- a connecting groove located in the bottom surface, the connecting groove being in communication with the wire guide portion and the lower recess.

12. A mobile robot, comprising:
a mobile module including a driver; and
a service module of detachably mounted on the mobile module, the service module including:
a main body having an accommodation space configured to receive an article therein, the main body having an upper portion including a top surface of the main body;
at least one Simultaneous Localization and Mapping (slam) module located at the upper portion of the main body, the upper end of the at least one slam module being located lower than the top surface of the main body by a predetermined gap;
an electric wire having a first end connected to the at least one slam module and a second end connected to an interior of the mobile module; and
a wire guide groove located in the main body to guide the electric wire connected to the at least one slam module,
wherein the mobile module includes:
- a body provided with the driver;
- a vertically extending display located at an upper side of a front portion of the body, the display located forwardly of the service module; and
- a module support plate located above the body to support the service module from below,
wherein the main body includes:
- a wire guide portion configured to guide the electric wire connected to the interior of the main body; and
- a lower recess recessed rearward from a front portion of the main body, the lower recess being in communication with the wire guide portion, and
wherein the display includes:
- a lower opening portion configured to communicate with an interior of the body;
- a rear opening portion configured to communicate with the lower recess; and
- a shutter configured to open and close the rear opening portion.

13. The mobile robot of claim 12, wherein the main body has a guide groove configured to receive at least a portion of the display therein.

14. The mobile robot of claim 12, wherein the display includes a shutter guide configured to guide raising and lowering movements of the shutter.

* * * * *